United States Patent [19]

Hollingsworth et al.

[11] Patent Number: 6,090,012
[45] Date of Patent: Jul. 18, 2000

[54] METHOD AND APPARATUS FOR CONTROLLING UPSHIFT ON AN AUTOMATIC TRANSMISSION

[75] Inventors: Rita Hollingsworth, Ortonville; Colt R. Correa, Lake Orion; Scott A. Miller, Rochester Hills, all of Mich.

[73] Assignee: DaimlerChrysler Corporation, Auburn Hills, Mich.

[21] Appl. No.: 09/283,456

[22] Filed: Apr. 1, 1999

[51] Int. Cl.[7] .................................................. B60K 41/06
[52] U.S. Cl. ............................................................ 477/117
[58] Field of Search ............................................. 477/117

[56] References Cited

U.S. PATENT DOCUMENTS

| | | |
|---|---|---|
| 4,258,591 | 3/1981 | Eckert et al. ........................... 477/117 |
| 4,912,997 | 4/1990 | Malcolm et al. . |
| 4,935,872 | 6/1990 | Benford et al. . |
| 5,097,725 | 3/1992 | Sawa . |
| 5,325,083 | 6/1994 | Nassar et al. . |
| 5,509,322 | 4/1996 | Anderson et al. . |
| 5,523,944 | 6/1996 | Kroger ...................................... 477/117 |
| 5,613,921 | 3/1997 | Sugiyama et al. . |
| 5,685,801 | 11/1997 | Benford et al. . |
| 5,722,292 | 3/1998 | Anderson et al. . |
| 5,778,311 | 7/1998 | Nakanishi . |

*Primary Examiner*—Dirk Wright
*Attorney, Agent, or Firm*—Mark P. Calcaterra

[57] ABSTRACT

The present invention provides a device for prohibiting upshift on an automatic transmission which has a controller adapted to select a gear ratio of the automatic transmission. The controller receives an output speed signal representative of a speed of the vehicle and throttle signal representative of a throttle position. Based on this information, the controller prohibits the automatic transmission from upshifting when the throttle position changes from a substantially open position to a substantially closed position at a rapid rate.

12 Claims, 6 Drawing Sheets

METHOD AND APPARATUS FOR CONTROLLING UPSHIFT ON AN AUTOMATIC TRANSMISSION

BACKGROUND OF THE INVENTION

1. Technical Field

The present invention relates generally to an automatic transmission and, more particularly, to an automatic transmission controller which modifies a shift schedule when a vehicle is performing under tipout conditions.

2. Discussion

Automatic transmissions automatically adjust the torque and speed which is transmitted to a vehicle's wheels from the vehicle's engine. This adjustment maximizes vehicle performance and fuel efficiency under varying road conditions and vehicle speeds. These transmissions usually contain four or five gears, three or four forward gears and one reverse gear, which provide different gear ratios between the vehicle's wheels and engine. The speed and torque transmitted to the vehicle's wheels are adjusted by shifting the transmission from one gear ratio to another. To change gear ratios, present automatic transmissions contain hydraulic or electric control systems which monitor engine speed, throttle position and a number of other variables which indicate vehicle speed and road conditions. The controller then positions the transmission in the proper gear ratio to maximize vehicle performance and fuel economy under the current road conditions and vehicle speed.

For instance, when a vehicle is traveling at a relatively high and constant velocity, the vehicle throttle position is substantially less than wide open throttle and the engine speed is relatively high. As such, the automatic transmission controller senses this engine speed and throttle position and places the transmission in a high gear ratio, such as third or fourth gear, producing a high speed and low torque at the wheels. When the vehicle is rapidly accelerated, such as when passing another vehicle, the throttle is moved to a substantially open or WOT (wide open throttle) position. Under these conditions, the control senses the changed throttle position and shifts the transmission to a lower gear such as first or second. As a result, more torque is provided to the wheels to allow the vehicle to accelerate. When the throttle resumes its previous position, the controller shifts the transmission back to a high gear. However, under certain conditions, this control system presents certain drawbacks.

Tipout, a high rate of backing out of the throttle, is a condition associated with the rapid transition from an accelerated or WOT condition to a slower or reduced throttle condition. Typically, tipout occurs after a driver passes another vehicle on the road, merges into traffic from an on ramp, or prior to accelerating around a curve. In this situation, the driver places the vehicle in a WOT condition until the vehicle is at a certain position. During WOT, the controller maintains the transmission in a low gear, such as first or second, to provide torque for acceleration. Then, after the driver achieves the required speed to pass the other vehicle or merge into traffic, the driver immediately reduces the throttle position and look around or determine the vehicle position.

Upon reduced throttle position, the controller shifts the transmission back to a high gear such as third or fourth creating the tipout condition. Typically, after the driver looks around, the driver needs the vehicle to once again accelerate to resume normal speed or for other reasons. However, since the vehicle is in a higher gear, it does not have the torque required for proper acceleration. As such, the transmission is, once again, forced to change into a lower gear for acceleration. This behavior is undesirable for a number of reasons. First, response time for accelerating the vehicle is reduced since the transmission must first downshift before the vehicle can accelerate. Second, this behavior requires the transmission to shift a number of times in a short period of time. This increases wear on the transmission components and increases noise, which a vehicle driver finds undesirable. The present invention was developed in light of these drawbacks.

SUMMARY OF THE INVENTION

The present invention addresses the aforementioned drawbacks, among others, by providing a device for prohibiting upshift on an automatic transmission which has a controller adapted to delay upshift when the throttle position on a vehicle engine rapidly transitions from an open position to a closed position. The controller receives an output speed signal and throttle signal representative of a throttle position. Based on this information, the controller prohibits the automatic transmission from upshifting when the throttle position changes from a substantially open position to a substantially closed position at a very fast rate.

In another aspect of the present invention, the controller prohibits upshift for a finite period of time when a tipout condition exists.

In other aspects of the present invention, the controller senses whether the vehicle engine is in a cruise control or autostick condition. When any of these conditions are true, the controller allows the automatic transmission to resume a normal shift pattern and upshift if necessary. The controller can also be programmed to disable the feature at high speeds to prevent the engine from revving at a high RPM due to being in the lower gear.

Additional advantages and features of the present invention will become apparent from the subsequent description and the appended claims taken in conjunction with the accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
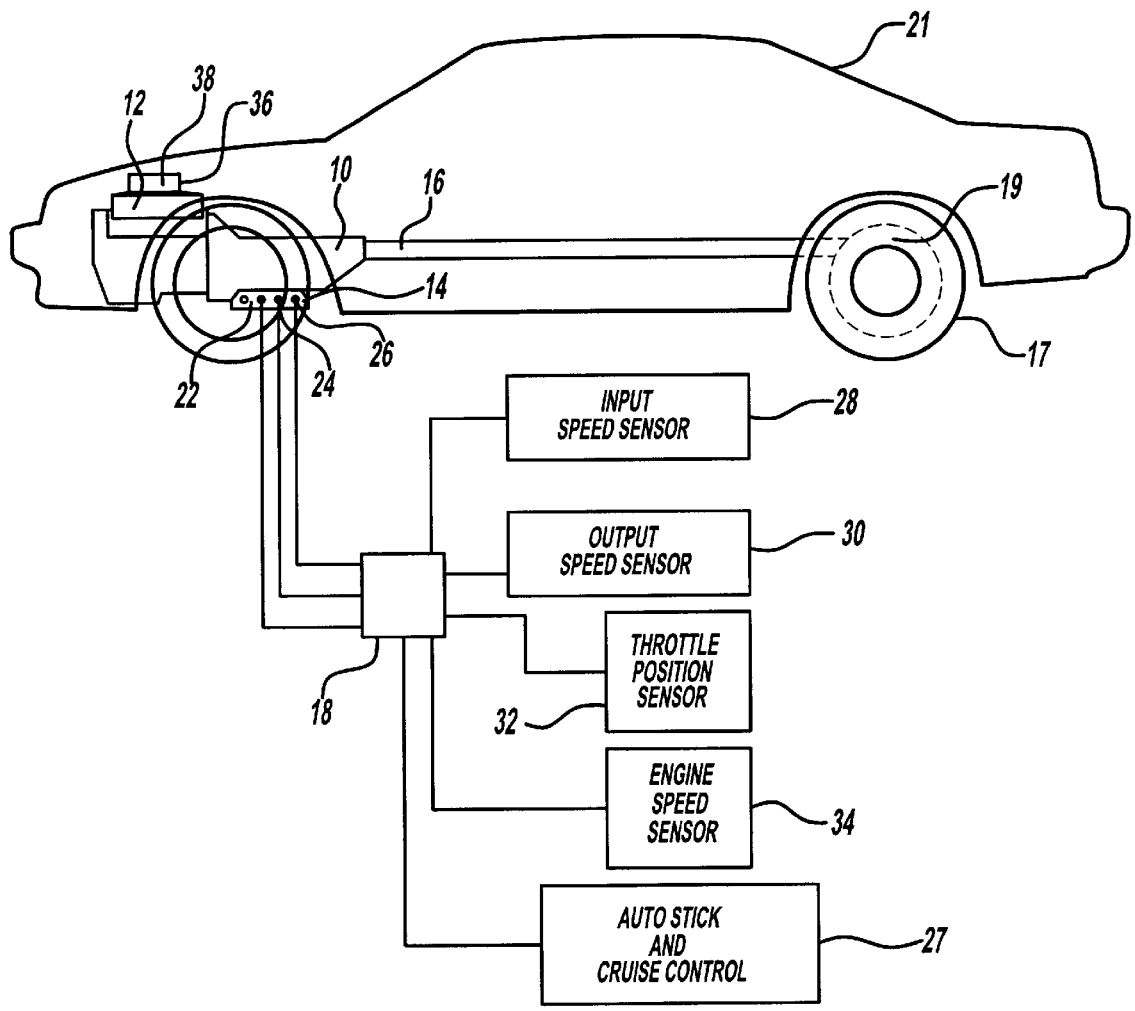
FIG. 1 is a schematic view of an automatic transmission according to the present invention.

Referring now to FIG. 1, an automatic transmission 10 is shown having a valve body 14 and an output shaft 16. Typically, automatic transmission 10 provides a gearing interface between wheels 17 and internal combustion engine 12 to adjust the torque and speed provided to output shaft 16 from internal combustion engine 12. As such, automatic transmission 10 can select four or five gears ratios, three or four forward gear ratios and one reverse gear ratio, for providing the optimum gear ratio between output shaft 16 and internal combustion engine 12. To change from one gear ratio to another, valve body 14 hydraulically communicates with a plurality of bands, gears, and clutches to cause clamping thereof around various portions of planetary gear sets within automatic transmission 10. This clamping and unclamping regulates the rotation of the planetary gear sets which, in turn, selects a specific gear ratio for automatic transmission 10. The output shaft 16 engages to the vehicle wheels 17 through differential 19 to drive the vehicle 21.

The above described automatic transmission and variations and modifications thereof are well known in the art. As such, the skilled artisan will appreciate that the present invention may be used with any of these modifications or variations and is not limited to the automatic transmission described herein.

Referring to FIG. 1, the present invention is now described. A controller such as computer 18 electrically communicates with valves 22, 24, and 26 of valve body 14 to actuate various combinations of bands and clutches to adjust the gear ratio as discussed above. Each valve 22, 24 and 26 is moved by a solenoid which is actuated by computer 18 to apply or remove hydraulic pressure to specific bands or clutches, thereby adjusting the gear ratio of automatic transmission 10.

To determine the proper gear ratio for automatic transmission 10, computer 18 must analyze a number of factors which include the current gear ratio of automatic transmission 10, speed of vehicle 21, throttle position 32 and engine speed of internal combustion engine 12. Input speed sensor 28 determines the rotational input speed to automatic transmission 10. Likewise, output speed sensor 30 provides an input to computer 18 representative of the velocity at which vehicle 21 is traveling. To determine the present gear ratio which automatic transmission 10 is operating in, input speed sensor 28 is compared to output speed sensor 30. The ratio of these sensors is determinative of the gear ratio of automatic transmission 10. Throttle position sensor 32 detects the amount of opening of the throttle blade in the throttle body 38. Lastly, engine speed sensor 34 determines the revolutions per minute which internal combustion engine 12 is turning.

Figure 2:
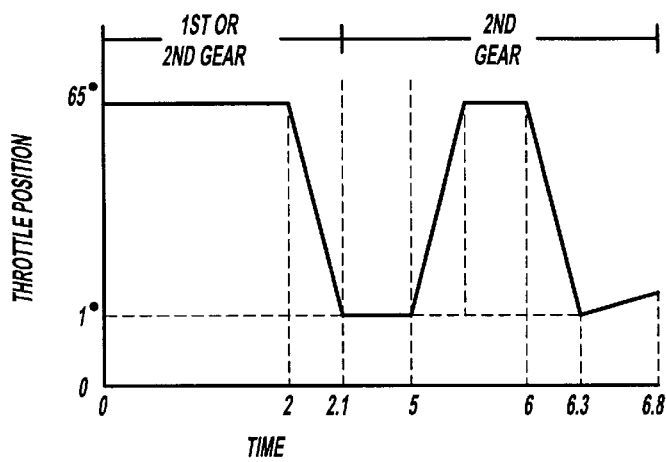
FIG. 2 is a graphical representation of a first operating scenario of an automatic transmission according to the present invention.

Referring now to FIGS. 2, 3, 4, and 5, the operation of the present invention is now described. In FIG. 2, a first driving scenario for vehicle 21 is graphically depicted. Here, at time=0, vehicle 21 is accelerated in either first or second gear with the throttle position of throttle blade 38 being either WOT or above 65 degrees. At time=2 seconds, the driver (not shown) of vehicle 21 takes his foot off the gas pedal at a rapid rate, creating a tipout condition and drastically reducing the throttle opening of throttle valve 38 from above 65 degrees at time=2 seconds to 1 degree at time=2.1 seconds. Between 2.1 seconds and 5 seconds, the driver looks around to determine the vehicle position on the road. During this time, the driver leaves his foot off the pedal causing the throttle position to be a value less than 2 degrees. Instead of upshifting to third or fourth gear between time=2 seconds and time=5 seconds, computer 18 of the present invention prohibits automatic transmission 10 from upshifting. As such, between time=2 seconds and time=5 seconds, computer 18 maintains automatic transmission 10 in second gear. Between time=5 seconds and time=6 seconds, the vehicle driver once again accelerates the vehicle, opening the throttle to an amount substantially greater than 2 degrees. This condition is known as tipping back in or tipback. Because the throttle is positioned greater than 2 degrees, a 0.5 second timer begins to run. At the end of the 0.5 seconds, time=5.5, the timer expires and the computer 18 resumes normal shift schedule. However, because of the throttle position and the vehicle speed, the normal shift logic leaves transmission 10 in second gear.

Between time=6 seconds and time=6.3 seconds, the vehicle driver again rapidly reduces the throttle position back to about 1 degree. Computer 18, again sensing the rapid deceleration, maintains automatic transmission 10 in second gear from time=6 seconds to time=6.3 seconds. However, at time=6.3 seconds, the vehicle driver begins to resume normal driving conditions and positions the throttle greater than 2 degrees. Computer 18 senses this position and begins a 0.5 second timer. As such, computer 18 maintains automatic transmission 10 in second gear for 0.5 seconds from time= 6.3 seconds to time=6.8 seconds. At time=6.8 seconds, computer 18 allows automatic transmission 10 to resume its normal shift pattern and upshift into third or fourth gear as required.

Figure 3:
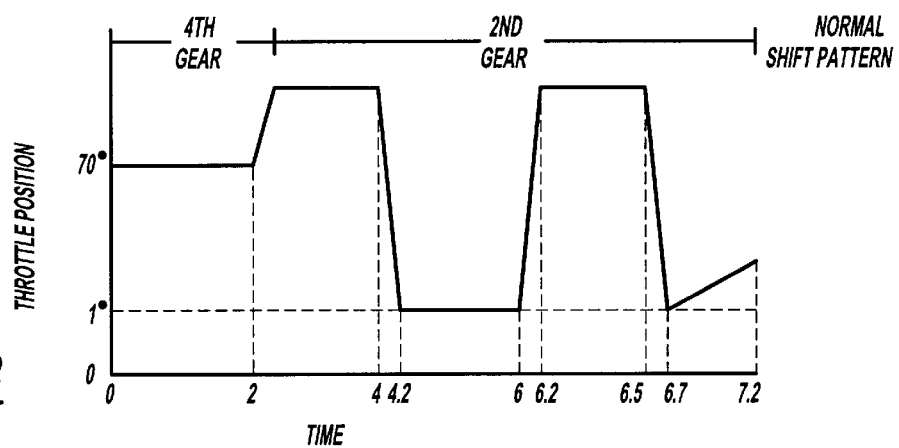
FIG. 3 is a graphical representation of a second operating scenario of an automatic transmission according to the present invention.

In FIG. 3, a second driving scenario using the present invention is described. Here, vehicle 21 starts off at time=0 traveling at a high speed, such as greater than 40 MPH, in fourth gear. At time=2, the vehicle driver opens the position of throttle body 38 to greater than 65 degrees or WOT, thereby accelerating vehicle 21 from time=2 seconds until time=4 seconds. In response, computer 18 instructs automatic transmission 10 to downshift from fourth gear to second gear. Between time=4 seconds and time=4.2 seconds, the vehicle driver takes his foot off the gas pedal, thereby reducing the position of throttle body 38 to 1 degree. As before, computer 18 maintains automatic transmission 10 in second gear between time=4.2 and 6 seconds where the throttle position is less than 2 degrees. As in FIG. 1, automatic transmission 10 maintains second gear during rapid reacceleration and deceleration from time=6 seconds until time=6.7 seconds. After 6.7 seconds, when the throttle position is again moved to greater than 2 degrees, 0.5 second timer begins, resulting in a normal shift pattern after time= 7.2 seconds.

Figure 4:
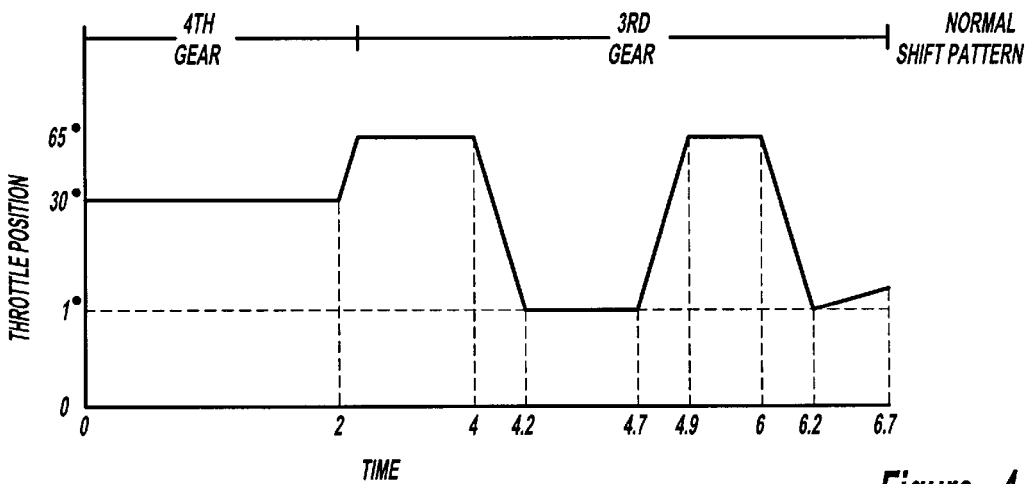
FIG. 4 is a graphical representation of a third operating scenario of an automatic transmission according to the present invention.

In FIG. 4, at time=0 seconds, vehicle 21 is traveling along at a relatively high rate of speed with the throttle position about 30 degrees until time=2 seconds. At time=2 seconds, the vehicle driver rapidly depresses the gas pedal and opens the position of throttle body 38 to greater than 65 degrees. Although the acceleration and accompanying throttle position of throttle body 38, as depicted in FIG. 4, is not quite as drastic as depicted in FIG. 3, it still causes computer 18 to downshift automatic transmission 10 into third gear. At time=4 seconds, the vehicle driver takes his foot off the gas pedal, thereby causing the opening of throttle body 38 to be reduced to 1 degree at time=4.2. As discussed previously, this would normally cause computer 18 to instruct automatic transmission 10 to upshift back into fourth gear. However, as before, computer 18 delays upshifting of automatic transmission 10. As such, automatic transmission 10 remains in third gear until time=6.7 seconds, at which point computer 18 allows automatic transmission 10 to resume its normal shift pattern.

Figure 5:
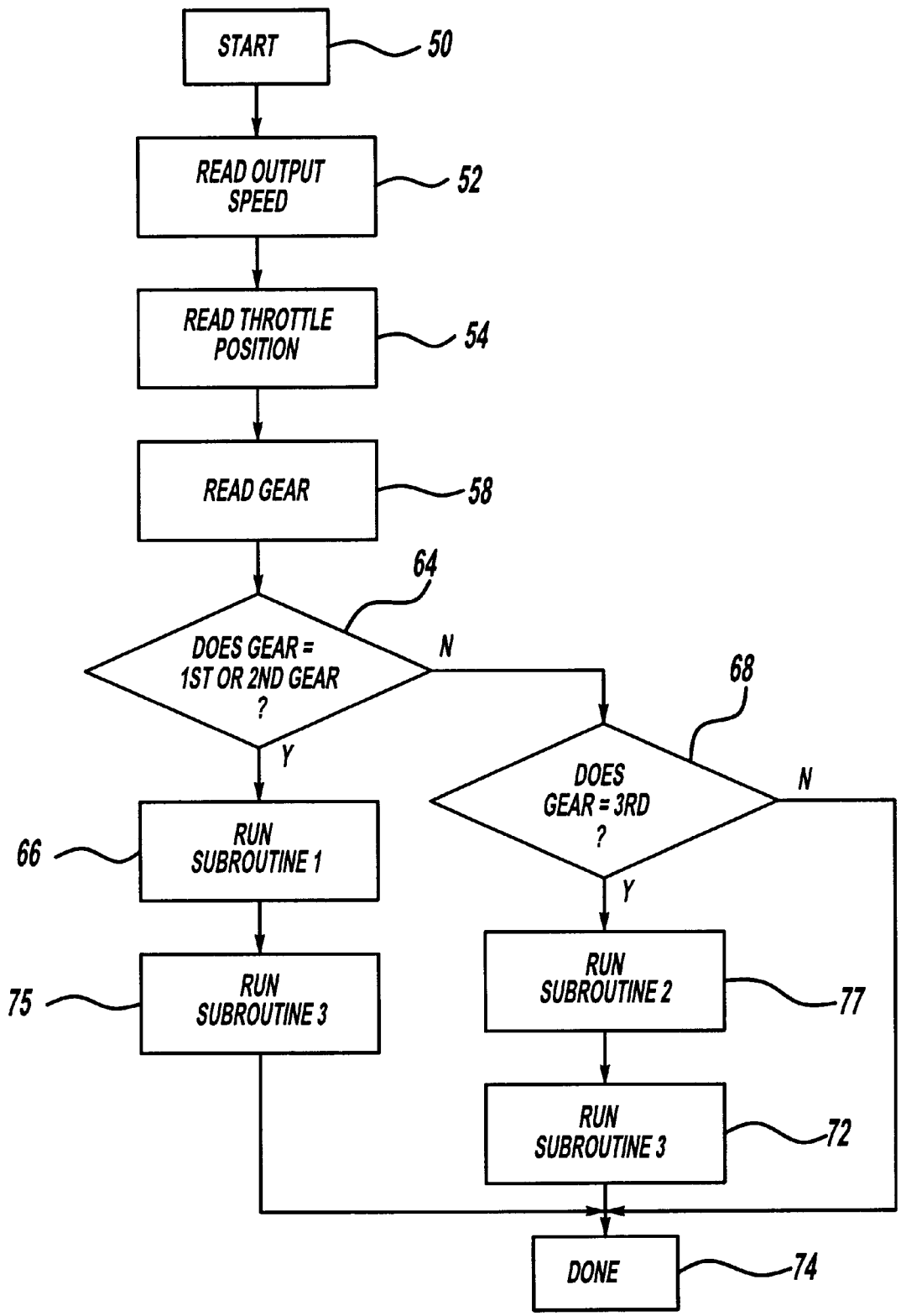
FIG. 5 is a flow diagram of a computer program controlling an automatic transmission according to the present invention.
Figure 6:
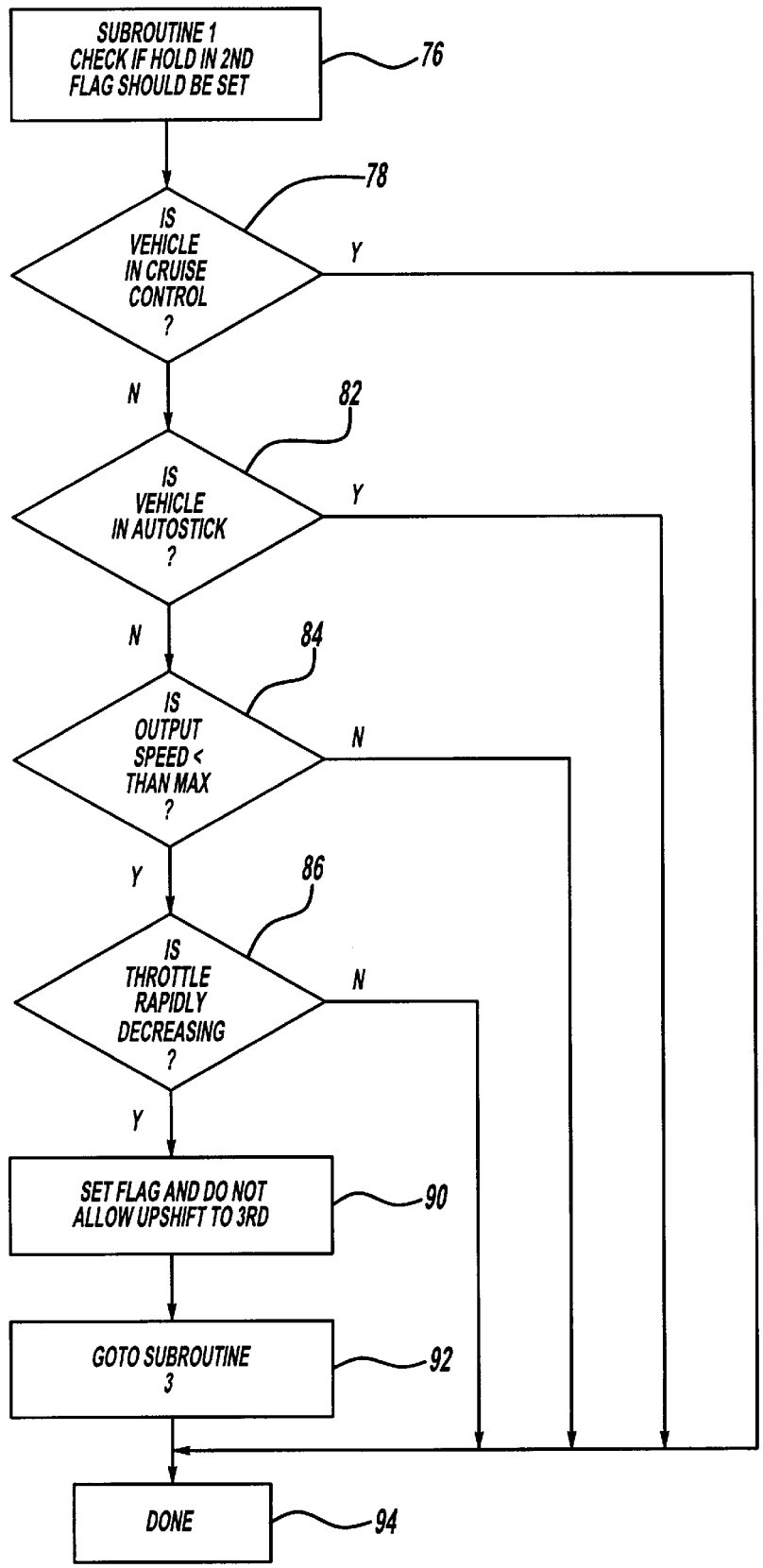
FIG. 6 is a flow diagram of a computer program controlling an automatic transmission according to the present invention.
Figure 7:
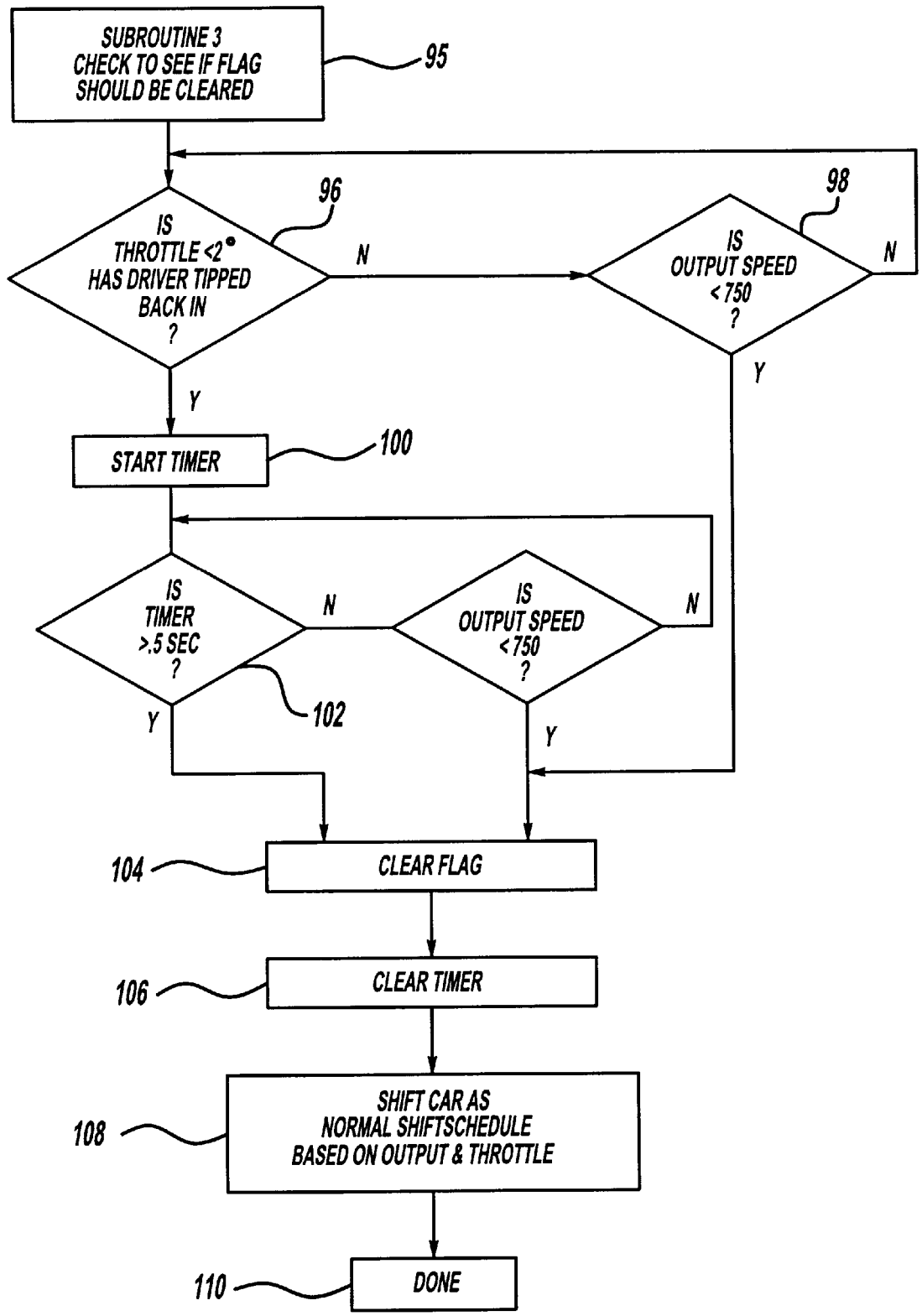
FIG. 7 is a flow diagram of a computer program controlling an automatic transmission according to the present invention.

With reference to FIGS. 5, 6, and 7, a flowchart depicts the logic sequence of computer 18 when instructing automatic transmission 10 in each of the scenarios depicted in FIGS. 2, 3, and 4. In FIG. 5, the program of computer 18 starts at block 50. Blocks 52, 54, and 56 read in information such as output speed, throttle position of throttle body 38, and gear ratio of automatic transmission 10. This information is obtained from input speed sensor 28, output speed sensor 30, throttle position sensor 32.

In decision block 64, the program determines whether or not automatic transmission 10 is in first or second gear. If either of these conditions are true, then a situation such as that depicted in FIG. 2 or 3 might exist. As such, computer 18 moves to block 66 and runs subroutine 1. If automatic transmission 10 is not in first or second gear, computer 18 next moves to decision block 68 to determine whether or not automatic transmission 10 is in third gear. If this condition is true, then a situation such as that depicted in FIG. 3 might be true. As such, computer 18 moves to block 72 and runs subroutine 2. If computer 18 determines from block 64 and 68 that automatic transmission 10 is in neither first, second, or third gear, then there is no reason to prohibit the automatic transmission 10 from upshifting since automatic transmission 10 is in the highest gear attainable. As such, computer 18 next moves to block 74 and continues with the normal shift pattern.

With reference to FIG. 6, subroutine 1 of block 66 in FIG. 5 is analyzed in greater detail. Subroutine 1 first starts at block 76. The subroutine then moves through block 78 and 82 to determine whether the vehicle 21 is in cruise control or autostick. If either of these conditions are true, the program exits and returns to the normal shift schedule. Block 84 next determines whether the engine RPM is greater than a predetermined value to protect the engine from running at high RPM, due to the transmission being in a low gear, while the vehicle is traveling at high speed. This RPM is determined by computer 18 reading engine speed from engine output speed sensor 34. Moving to block 86, subroutine 1 determines whether the throttle is rapidly decreasing. This is determined by reading the throttle position from throttle position sensor 32 and measuring it per rate of time. If the throttle is rapidly decreasing, block 90 sets the flag, not allowing an upshift to third gear, and block 92 moves to subroutine 3 to determine if the flag should be cleared (as will be discussed). If the throttle is not rapidly decreasing, computer 18 exits subroutine 1 and returns to the normal shift schedule.

With reference to FIG. 7, subroutine 3 is discussed in greater detail. After starting in block 95, subroutine 3 moves to block 96 to determine whether the throttle position is greater than 2 degrees. This signifies whether the driver is tipping back in as illustrated in FIG. 1 between time=6.3 seconds and time=6.8 seconds. If this is true, then block 100 starts the 0.5 second timer. Block 102 ensures the timer remains in place for 0.5 seconds. After the 0.5 seconds expires, block 104 clears the flag and block 106 clears the timer. Then, block 108 resumes the normal shift schedule. If decision block 96 determines that the driver has not tipped back in, then block 98 determines whether the output speed, from output speed sensor 34 is less than 750 RPM. If this is true, then the vehicle is most likely coasting to a stop. As such, the program moves to block 104 and clears the flag and timer. If the output RPM is greater than 750 RPM, then computer 18 returns to block 96 to check if the throttle is greater than 2 degrees.

Figure 8:
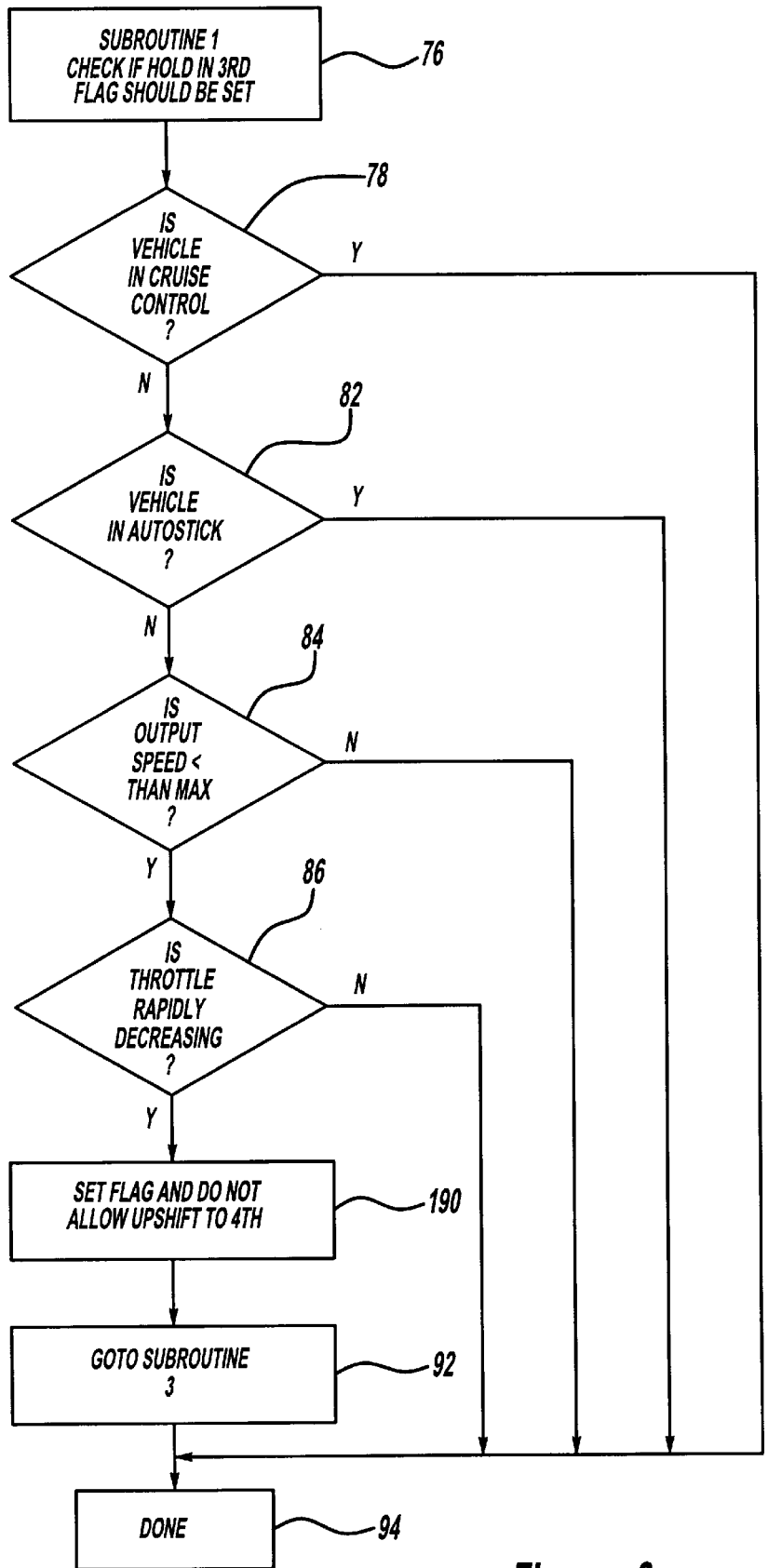
FIG. 8 is a flow diagram of a computer program controlling an automatic transmission according to the present invention.

With reference to FIG. 8, subroutine 2 is shown in greater detail. As shown subroutine 2 operates the same as subroutine 1 except that block 90 is replaced with block 190 which prohibits upshift from gear 3 to 4. Otherwise, this program operates the same as subroutine 1.

While the above detailed description describes the preferred embodiment of the invention, it should be understood that the present invention is susceptible to modification, variation, and alteration without deviating from the scope and fair meaning of following claims.

What is claimed is:

1. A device for prohibiting upshift in an automatic transmission in a vehicle, comprising:

an automatic transmission;

a controller adapted to select a gear ratio of said automatic transmission, said controller receiving an engine speed signal representative of a speed of said internal combustion engine and a throttle signal representative of a throttle position, said controller prohibiting said automatic transmission from upshifting when said throttle position transitions from a substantially large amount to a substantially small amount in a short period of time and said automatic transmission is in a gear other than a highest gear attainable by said automatic transmission, wherein said controller prohibits said automatic transmission from upshifting for a predetermined and finite period of time when a driver of said vehicle is tipping back in.

2. A device as claimed in claim 1, wherein said throttle signal is generated from a throttle sensor in mechanical communication with a throttle valve on a carburetor controlling air entering said internal combustion engine.

3. A device as claimed in claim 1, wherein said substantially large amount equates to a range between 75% and 100% opening and said substantially small amount equates to a less than 2% opening.

4. A device as claimed in claim 1, wherein said low gear is a member of the set consisting of first gear and second gear.

5. A device as claimed in claim 4, wherein said upshifting is a transition from a second gear to a third gear.

6. A device as claimed in claim 1, wherein said low gear is a third gear.

7. A device as claimed in claim 6, wherein said upshifting is a transition from a second gear to a third gear.

8. A device as claimed in claim 1, wherein said finite period of time is less than 0.6 seconds.

9. A device as claimed in claim 1, wherein said controller senses whether said internal combustion engine is in a autostick condition, said controller allowing said automatic transmission to upshift if said internal combustion engine is in said autostick condition.

10. A device as claimed in claim 1, wherein said controller senses whether said internal combustion engine is in a cruise control condition, said controller allowing said automatic transmission to upshift if said internal combustion engine is in said cruise control condition.

11. A method of selecting a shift pattern for an automatic transmission, comprising the steps of:

a. sensing a throttle position of an internal combustion engine;

b. sensing a gear ratio of said automatic transmission;

c. prohibiting said automatic transmission from upshifting when said throttle position transitions from a substantially open position to a substantially closed position and when said gear ratio of said automatic transmission is in a gear other than a highest gear attainable by said automatic transmission; and d. prohibiting said automatic transmission from upshifting for a predetermined and finite period of time when a driver of said vehicle is tipping back in.

12. A method as claimed in claim 11, wherein said throttle position is sensed by monitoring a position of a throttle on a throttle body.

* * * * *